US012752668B2

(12) United States Patent
Lee et al.

(10) Patent No.: US 12,752,668 B2
(45) Date of Patent: Oct. 6, 2026

(54) FUEL CELL VEHICLE AND CONTROLLING METHOD THEREOF

(71) Applicants: HYUNDAI MOTOR COMPANY, Seoul (KR); KIA CORPORATION, Seoul (KR)

(72) Inventors: Dong Kwan Lee, Busan (KR); Seong Cheol Jeong, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 699 days.

(21) Appl. No.: 18/139,986

(22) Filed: Apr. 27, 2023

(65) Prior Publication Data

US 2024/0194913 A1 Jun. 13, 2024

(30) Foreign Application Priority Data

Dec. 12, 2022 (KR) ........................ 10-2022-0172852

(51) Int. Cl.

*B60L 58/40* (2019.01)
*B60L 58/12* (2019.01)
*B60L 58/30* (2019.01)
*H01M 8/04537* (2016.01)
*H01M 8/04858* (2016.01)

(52) U.S. Cl.

CPC ......... *B60L 58/30* (2019.02); *H01M 8/04626* (2013.01); *H01M 8/04925* (2013.01); *H01M 2250/20* (2013.01)

(58) Field of Classification Search

CPC ......... H01M 8/04626; H01M 8/04925; H01M 2250/20; H01M 16/006; B60L 15/2045; B60Y 2200/91; B60Y 2400/202; Y02T 90/40

USPC .......................................................... 700/291

See application file for complete search history.

(56) References Cited

U.S. PATENT DOCUMENTS

| | | | |
|---|---|---|---|
| 7,884,567 | B2 | 2/2011 | Kim et al. |
| 8,399,141 | B2 | 3/2013 | Kim et al. |
| 10,367,216 | B2 | 7/2019 | Jin et al. |
| 10,826,092 | B2 | 11/2020 | Furuyama et al. |
| 2008/0116843 | A1 | 5/2008 | Kim et al. |
| 2010/0173211 | A1 | 7/2010 | Kim et al. |

(Continued)

FOREIGN PATENT DOCUMENTS

| | | |
|---|---|---|
| JP | 2008130424 A | 6/2008 |
| JP | 2010161073 A | 7/2010 |

(Continued)

*Primary Examiner* — Paul B Yanchus, III
*Assistant Examiner* — Michael V Farina
(74) *Attorney, Agent, or Firm* — Lempia Summerfield Katz LLC

(57) ABSTRACT

A fuel cell vehicle includes: a fuel cell; a battery; and a controller that determines a load demanded output value. In particular, the controller determines whether a first condition related to overcharge of the battery and a second condition related to over-discharge of the battery are satisfied based on the load demanded output value, and further determines whether a constant output is operable based on an output efficiency of the fuel cell when the first and second conditions are satisfied. The controller controls an output of the fuel cell according to a result of the determination.

17 Claims, 7 Drawing Sheets

(56) References Cited

U.S. PATENT DOCUMENTS

| | | | | |
|---|---|---|---|---|
| 2011/0014533 | A1* | 1/2011 | Jennings | H01M 8/04619 429/444 |
| 2017/0144647 | A1* | 5/2017 | Gutruf | B60W 20/00 |
| 2018/0026283 | A1 | 1/2018 | Furuyama et al. | |
| 2018/0198144 | A1 | 7/2018 | Jin et al. | |
| 2023/0202347 | A1* | 6/2023 | Lavertu | B60L 15/38 701/22 |
| 2023/0261228 | A1* | 8/2023 | Qiu | H01M 8/04589 429/431 |
| 2023/0271513 | A1* | 8/2023 | Ortmann | B60L 58/12 701/22 |

FOREIGN PATENT DOCUMENTS

| | | | |
|---|---|---|---|
| JP | 2017147121 | A | 8/2017 |
| JP | 2018014174 | A | 1/2018 |
| KR | 100805591 | B1 | 2/2008 |
| KR | 20120064357 | A | 6/2012 |
| KR | 20180082669 | A | 7/2018 |
| KR | 102086352 | B1 | 3/2020 |

* cited by examiner

FUEL CELL VEHICLE AND CONTROLLING METHOD THEREOF

CROSS REFERENCE TO RELATED APPLICATION

The present application claims priority to Korean Patent Application No. 10-2022-0172852, filed Dec. 12, 2022, the entire contents of which are incorporated herein by reference.

FIELD

The disclosure relates to a fuel cell vehicle capable of improving driving efficiency by enlarging a constant output section of a fuel cell and to a control method thereof.

BACKGROUND

An eco-friendly vehicle including a fuel cell electric vehicle (FCEV) refers to a vehicle that is driven by a drive motor. Electric energy is supplied to the drive motor to rotate the drive motor.

For example, a fuel cell vehicle includes a fuel cell that generates electrical energy through a reaction between hydrogen and oxygen and a battery that stores the electrical energy generated by the fuel cell or provides the stored electrical energy to a drive motor.

When the drive motor uses the electric energy provided from the fuel cell and the battery, the electric energy provided to the drive motor is determined by summing up electric energies provided from each of the fuel cell and the battery.

Accordingly, the efficiency of the fuel cell vehicle may be improved by properly distributing an amount of electric energy provided from each of the fuel cell and the battery.

However, in the case that the output of the fuel cell is determined based only on the distribution conditions, the output efficiency of the fuel cell itself is not considered, so it is desired to propose an output control method in consideration of an output section with high efficiency of the fuel cell.

The discussion of the related art is given to gain a sufficient understanding of the related art of the disclosure only and it should not be interpreted that the related art belongs to technologies that are well-known to those of having ordinary skill in the art.

SUMMARY

An object of the disclosure is to provide a fuel cell vehicle capable of improving driving efficiency by determining a constant output operable section based on vehicle information when the fuel cell vehicle is operated, and enlarging the constant output section through the determination, and a control method thereof.

The technical objects of the disclosure are not limited to the aforementioned technical objects, and other technical objects, which are not mentioned above, should be apparently appreciated by a person having ordinary skill in the art from the following description.

In order to achieve the above object, a fuel cell vehicle according to an embodiment of the disclosure includes a fuel cell; a battery; and a controller that determines a load demanded output value required by a load in a vehicle. In particular, the controller determines whether a first condition related to overcharge of the battery and a second condition related to over-discharge of the battery are satisfied based on the load demanded output value, determines whether a constant output is operable in consideration of an output efficiency of the fuel cell based on the load demanded output vale and a current battery SOC (state of charge) if the first and second conditions are satisfied, and controls an output of the fuel cell according to a result of the determination.

In another embodiment of the disclosure, a method for controlling a fuel cell vehicle includes steps of: determining a load demanded output value required for an entire load; determining whether a first condition related to overcharge of a battery and a second condition related to over-discharge of the battery are satisfied based on the load demanded output value; determining whether a constant output is operable in consideration of an output efficiency of a fuel cell based on the load demanded output value and a current battery SOC (State of Charge) if the first condition and the second condition are satisfied; and controlling an output of the fuel cell based on a result of the determination.

As described above, according to various embodiments of the disclosure, the constant output section of the fuel cell can be enlarged, so that the output efficiency can be improved.

In addition, as the constant output operation section of the fuel cell is enlarged, it is possible to minimize the output fluctuation of the fuel cell.

In addition, as the constant output operation section of the fuel cell is enlarged, output consumption of fuel cell accessories can be reduced.

Furthermore, it is possible to improve fuel efficiency of a fuel cell vehicle by improving the output efficiency of the fuel cell and reducing output consumption of fuel cell accessories.

Advantages which can be obtained in the disclosure are not limited to the aforementioned effects and other unmentioned advantages should be clearly understood by those having ordinary skill in the art from the following description.

Figure 1:
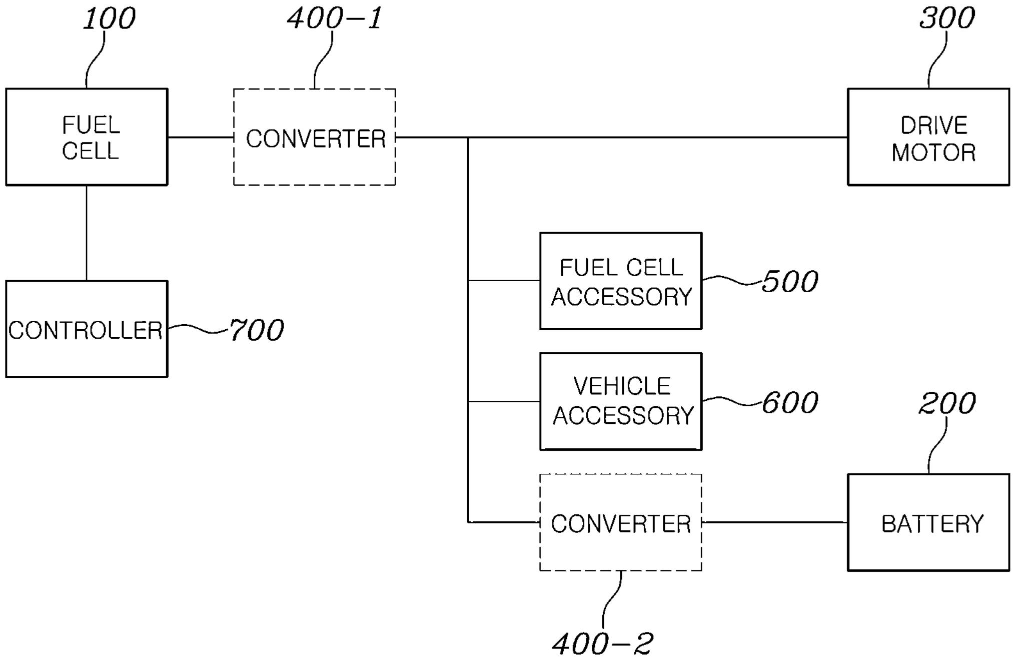
FIG. 1 is a diagram showing an example of the configuration of a fuel cell vehicle applicable to embodiments of the disclosure.

The drawings described herein are for illustration purposes only and are not intended to limit the scope of the present disclosure in any way.

DETAILED DESCRIPTION

Specific structural and functional descriptions of embodiments of the disclosure disclosed in the present specification or application are only for illustrative purposes of the embodiments of the disclosure. The embodiments of the disclosure may be embodied in many different forms, and should not be construed as limiting the disclosure herein.

While the disclosure is susceptible to various modifications and alternative forms, specific embodiments are shown by way of example in the drawings and described in detail. It should be understood, however, that the description is not intended to limit the disclosure to the specific embodiments, but, on the contrary, the disclosure is to cover all modifications, equivalents, and alternatives that fall within the spirit and scope of the disclosure.

Unless otherwise defined, all terms, including technical and scientific terms, used herein have the same meaning as commonly understood by those having ordinary skill in the art to which the disclosure pertains. It should be further understood that terms defined in commonly used dictionaries should be interpreted as having a meaning that is consistent with their meaning in the context of the related art and should not be interpreted in an idealized or overly formal sense unless expressly so defined herein.

Hereinafter, some embodiments of the disclosure are described in greater detail with reference to the accompanying drawings. To facilitate overall understanding of the disclosure, like numbers refer to like elements throughout the description of the drawings, and description of the same component is not reiterated.

The suffixes "module" and "unit" for the elements used in the following description are added or mixed considering only for convenience of writing specification, but do not have meanings or functions distinguished with each other in itself.

A detailed description of well-known technology is not given in describing embodiments of the present disclosure lest it should obscure the subject matter of the embodiments. The attached drawings are provided to help the understanding of the embodiments of the present disclosure, not limiting the scope of the present disclosure. It is to be understood that the present disclosure covers various modifications, equivalents, and/or alternatives falling within the scope and spirit of the present disclosure.

Although the terms "first," "second," etc. may be used herein in reference to various elements, such elements should not be construed as limited by these terms. These terms are only used to distinguish one element from another.

It should be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

As used herein, the singular forms are intended to include the plural forms as well, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

It will be further understood that the terms "comprises," or "have", when used herein, specify the presence of stated features, integers, steps, operations, elements, parts, and/or combinations thereof, but do not preclude the presence or addition of one or more other features, integers, steps, operations, elements, parts, and/or combinations thereof.

In addition, the terms "unit" or "control unit" forming part of the names of the motor control unit (MCU) and the hybrid control unit (HCU) are merely terms that are widely used in the naming of a controller for controlling a specific function of a vehicle, and should not be construed as meaning a generic function unit.

In order to control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

A fuel cell vehicle and a control method thereof according to an embodiment of the disclosure propose improve driving efficiency by determining a constant output operable section based on vehicle information when the fuel cell vehicle is driving, and enlarging the constant output section through the determination.

Here, a constant output value is a value determined in consideration of the output efficiency of the fuel cell, and may be determined from an output efficiency map of the fuel cell or through a vehicle test value.

Prior to describing a fuel cell vehicle and control method thereof according to an embodiment of the disclosure, the structure and control system of a fuel cell vehicle applicable to embodiments are first described.

FIG. 1 is a diagram showing an example of the configuration of a fuel cell vehicle according to embodiments of the present disclosure.

Referring to FIG. 1, a fuel cell vehicle may include a fuel cell 100, a battery 200, a drive motor 300, a converter 400-1, 400-2, (collectively "400"), a fuel cell accessory 500, a vehicle accessory 600, and a controller 700. FIG. 1 mainly shows components related to the present disclosure, and it is obvious that an actual fuel cell vehicle may include more or fewer components than these.

First, the fuel cell 100 may generate power by a chemical reaction between hydrogen and oxygen. Specifically, a polymer electrolyte fuel cell (PEFC) may be used as a drive source for driving the fuel cell vehicle.

The fuel cell 100 may be connected to the battery 200, the drive motor 300, the fuel cell accessory 500, and the vehicle accessory 600 through a main line. The main line may be maintained at the same voltage as the output voltage of the fuel cell 100 while connected to the fuel cell 100.

In addition, the battery 200 may be charged by the power generated by the fuel cell, or supply power to the outside while discharging the charged power. Here, the battery 200 may be, for example, a high voltage battery (HV Battery).

In one embodiment, the converter 400 connected to the fuel cell 100 may be disposed between the fuel cell 100 and the drive motor 300 or disposed between the fuel cell 100 and the battery 200.

In the case that the converter 400 is disposed between the fuel cell 100 and the drive motor 300, the converter 400 may be implemented as a fuel cell DC-DC converter (FDC) 400-1. In the case that the converter 400 is disposed between the fuel cell 100 and the battery 200, the converter 400 may be implemented as a bi-directional high-voltage DC-DC converter (BHDC) 400-2.

Additionally, a fuel cell vehicle according to an embodiment may include the fuel cell accessory 500 and the vehicle accessory 600. The fuel cell accessory 500 may include, for example, a hydrogen recirculation blower of a hydrogen supply device, an air blower of an air supply device, a water supply device for cooling water circulation, and the like.

In one embodiment, the controller 700 may determine a load demanded output value required from a load in the vehicle based on vehicle information.

In another embodiment, the controller 700 may determine whether a first condition related to overcharge of the battery 200 and a second condition related to over-discharge of the battery 200 are satisfied based on the load demanded output value.

If the first condition and the second condition are satisfied, the controller 700 determines that the precondition for constant output control is satisfied, determines whether constant output is operable based on the load demanded output value and a current battery SOC, and may control the output of the fuel cell 100 based on the result of the determination.

In an embodiment, the controller 700 may be implemented as a fuel cell control unit (FCU), but is not necessarily limited thereto. It may be implemented in a distributed control manner through two or more controllers, such as performing some functions by a vehicle control unit (VCU) and performing other functions by a fuel cell controller.

Hereinafter, details of the constant output control logic of the controller 700 are described with reference to FIG. 2.

Figure 2:
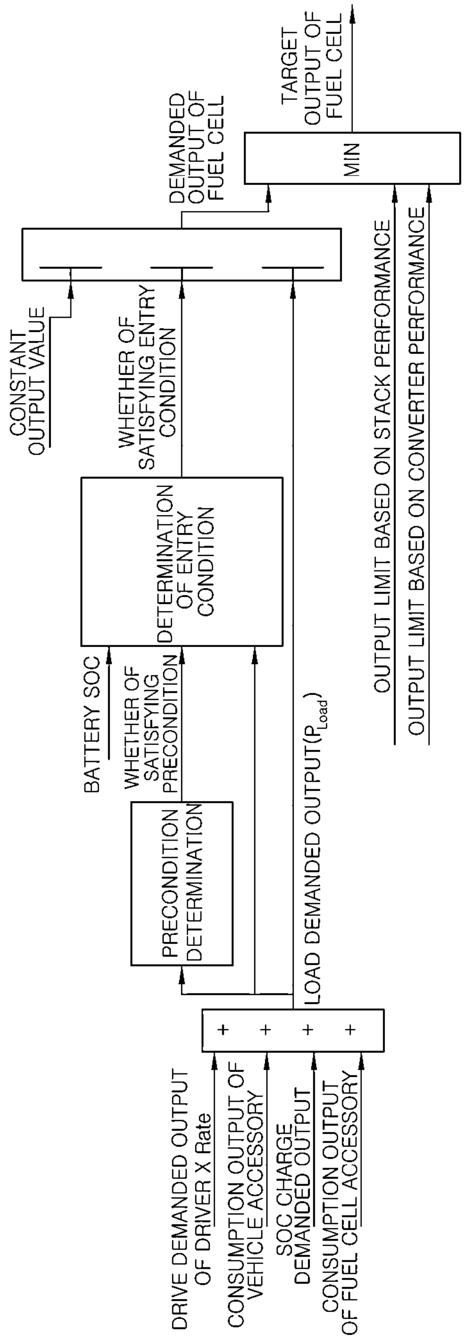
FIG. 2 is a diagram illustrating a constant output control logic of a controller of a fuel cell vehicle according to an embodiment of the disclosure.

FIG. 2 is a diagram illustrating a constant output control logic of a controller of a fuel cell vehicle according to an embodiment of the disclosure.

Referring to FIG. 2, first, the controller 700 may determine a load demanded output value based on input vehicle information. The load demanded output value is an output value required from the load in the vehicle, and may be determined based on a value obtained by summing an output value distributed to the fuel cell 100 among the drive demanded output of a driver, an accessory consumption output value of the fuel cell consumed in the operation of the fuel cell accessory 500, the accessory consumption output value of the vehicle consumed by the vehicle accessory 600, and the charge demanded output value of the battery required for charging the battery 200.

In addition, the controller 700 may determine whether a precondition is satisfied in order to prevent the overcharge or over-discharge of the battery 200 according to the constant output.

In one embodiment, whether the first condition related to the overcharge of the battery 200 is satisfied may be determined based on a constant output value, a load demanded output value, and a maximum chargeable output value of the battery capable of charging the battery to an upper charge limit.

More specifically, the first condition may be satisfied if a value obtained by subtracting the load demanded output value from the constant output value is less than the maximum chargeable output value of the battery.

In other words, whether the first condition is satisfied may be determined by the following equation.

$$P_1 - P_{load} < P_{ChrPwrLim}, (P_1 > P_{Load})$$

Here, $P_1$ is the constant output value, $P_{Load}$ is the load demanded output value, and $P_{ChrPwrLim}$ is the maximum chargeable output value of the battery. The first condition is determined in a section where the constant output value is greater than the load demanded output value.

By determining whether the first condition is satisfied prior to entering the constant output control, it is possible to prevent excess output from excessively charging the battery 200 at the constant output of the fuel cell 100 when the load demanded output value is too small compared to the constant output value.

In another embodiment, whether the second condition related to over-discharge of the battery 200 is satisfied may be determined based on the constant output value, the load demanded output value, the output value distributed to the battery among the drive demanded output value of the driver, and the maximum dischargeable output value of the battery capable of discharging the battery to the upper discharge limit value.

More specifically, the second condition may be satisfied if a value obtained by subtracting the constant output value from the load demanded output value is less than a value obtained by subtracting the output value distributed to the battery among the drive demanded output value of the driver from the maximum dischargeable output value of the battery.

In other words, whether the second condition is satisfied may be determined by the following equation.

$$P_{Load} - P_1 < (P_{DchPwrLim} - P_{DrvPwrReq}(1-\text{Rate})), (P_1 < P\_\text{Load})$$

Here, $P_1$ is the constant output value, $P_{Load}$ is the load demanded output value, $P_{DchPwrLim}$ is the maximum dischargeable output value of the battery, $P_{DrvPwrReq}$ is the drive demanded output value of the driver, and "Rate" is the distribution rate for the fuel cell. The second condition is determined in the section where the constant output value is smaller than the load demanded output value.

By determining whether the second condition is satisfied prior to entering the constant output control, it is possible to prevent a problem in which the battery 200 is over-discharged because the battery 200 excessively shares the insufficient output at the constant output of the fuel cell in the case that the load demanded output value is excessively greater than the constant output value.

In another embodiment, the controller 700 may determine whether the first condition and the second condition are satisfied based on whether the load demanded output value is included in the range of the load demanded output value preset to satisfy the first condition and the second condition.

For example, the range of the load demanded output value may be set as follows.

$$P_1 - P_{ChrPwrLim} < P_\alpha < P_{Load} < P_\beta < P_1 + (P_{DchPwrLim} - P_{DrvPwrReq}(1-\text{Rate}))$$

In this case, the controller 700 may determine that the first condition and the second condition are satisfied if the load demanded output value is included in the range defined by $P_\alpha$ and $P_\beta$.

In another embodiment, the controller 700 may determine whether the constant output is operable in consideration of the output efficiency of the fuel cell based on the load demanded output value and the current battery SOC (State of Charge) if the first condition and the second condition are satisfied.

In this case, the controller 700 may determine whether the constant output of the fuel cell 100 is operable in further consideration of a comparison result between the constant output value and the load demanded output value.

First, if the load demanded output value is less than the constant output value, the controller 700 charges the battery 200 and performs the battery charge-constant output control, which performs the constant output control of the fuel cell.

In this case, the controller 700 may determine whether the constant output of the fuel cell 100 is operable in further consideration of the constant output value and the maximum SOC of the battery determined based on the maximum dischargeable output value of the battery capable of discharging the battery to the upper discharge limit.

When the load demanded output value is greater than or equal to the constant output value, the battery 200 is discharged, and the battery discharge-constant output control, which performs the constant output control of the fuel cell, is performed.

In this case, the controller 700 may determine whether the constant output of the fuel cell 100 is operable in further consideration of the constant output value and the minimum SOC of the battery determined based on the maximum chargeable output value capable of charging the battery to the upper charge limit.

In addition, the controller 700 may determine whether the constant output of the fuel cell 100 is operable in further consideration of a change in the current battery SOC and load demanded output value.

On the other hand, by reflecting the vehicle information as described above, as it is determined whether the constant output is operable in consideration of the output efficiency of the fuel cell 100, the proportion in which the fuel cell 100 operates at the constant output during driving can be enlarged. Through this, it is possible to perform constant output of the fuel cell 100 not only in a low output section but also in a high output section.

Details of determining whether the constant output is operable in consideration of the output efficiency of the fuel cell 100 are described with reference to FIGS. 3 and 4.

In one embodiment, the controller 700 may control the output of the fuel cell based on a result of determining whether the constant output is operable in consideration of the output efficiency of the fuel cell 100.

More specifically, the controller 700 may control the output of the fuel cell 100 based on the constant output value, considering that the entry condition for the constant output control is satisfied when the constant output of the fuel cell 100 is operable based on the result of the determination.

On the other hand, if the constant output of the fuel cell 100 is not operable based on the result of the determination, the controller 700 may control the output of the fuel cell 100 based on the load demanded output value, considering that the entry condition for the constant output control is not satisfied.

In addition, the controller 700 may control the output of the fuel cell in further consideration of at least one of an output limit value according to the performance of the fuel cell 100 and an output limit value according to the performance of the converter 400 provided in the vehicle.

In one embodiment, the controller 700 may determine the smallest value among the demanded output values of the fuel cell, the output limit value according to the performance of the fuel cell 100, and the output limit value according to the performance of the converter 400 provided in the vehicle, as a target output value of the fuel cell, and control the fuel cell 100 to output the target output value of the fuel cell.

Here, in the case that it is determined that the constant output is operable in consideration of the output efficiency of the fuel cell 100, the controller 700 may determine the constant output value as the demanded output value of the fuel cell. In the case that it is determined that the constant value is not operatable in consideration of the output efficiency of the fuel cell 100, the controller 700 may determine the load demanded output value as the demanded output value of the fuel cell.

Hereinafter, referring to FIGS. 3 and 4, the determination of whether the constant output is operable based on the output efficiency of the fuel cell 100 according to embodiments is described below in detail.

Figure 3:
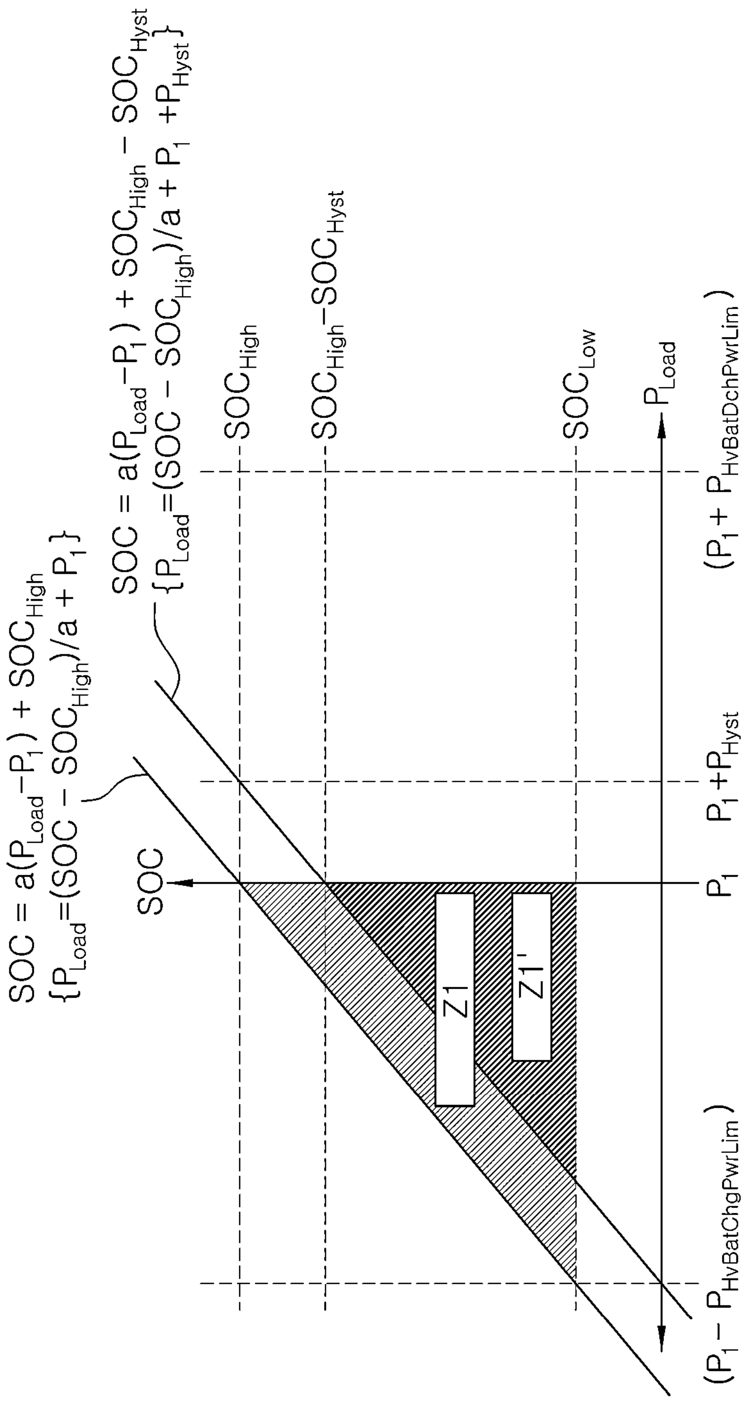
FIG. 3 is a diagram illustrating a battery charge-constant output logic of a fuel cell vehicle according to an embodiment of the disclosure.

FIG. 3 is a diagram for explaining a battery charge-constant output logic of a fuel cell vehicle according to an embodiment of the disclosure.

Referring to FIG. 3, a graph in which a horizontal axis is the load demanded output value ($P_{Load}$) and a vertical axis is the SOC is shown.

The straight line located on the left side may be defined by the following equation.

$$SOC = a(P_{Load} - P_1) + SOC_{High}, \text{ or}$$

$$P_{Load} = \frac{SOC - SOC_{High}}{a} + P_1$$

Here, SOC is a current battery SOC, "a" is a first constant corresponding to a slope of the straight line, $P_{Load}$ is the load demanded output value, $P_1$ is the constant output value, and $SOC_{High}$ is the maximum SOC of the battery. Here, since the battery SOC is generally expressed in [%] units, the load demanded output value and the constant output value may be converted and calculated in [%] units by reflecting the capacity of the battery 200 and the like. Conversely, since the output value is generally expressed in [KW] units, the battery SOC may be converted and calculated in [kw] units by reflecting the capacity of the battery 200 and the like. This calculation method may be similarly applied to the relational expression described below.

On the other hand, in the case that the load demanded output value is less than the constant output value, the controller 700 may determine that the constant output considering the output efficiency of the fuel cell is operable if the current battery SOC is less than or equal to a value obtained by subtracting a SOC corresponding to a value, which is obtained by multiplying the portion exceeding the load demanded output value among the constant output value by a first constant, from the maximum SOC of the battery.

In other words, it may be determined that the constant output considering the output efficiency of the fuel cell 100 is operable in a section satisfying the following equation on the graph.

$$SOC \le a(P_{Load} - P_1) + \text{SOC\_High}, \text{ or}$$

$$P_{Load} \ge \frac{SOC - SOC_{High}}{a} + P_1$$

Here, as the precondition is satisfied, it is assumed that the load demanded output value is greater than a value obtained by subtracting the maximum chargeable output value of the battery from the constant output value, and smaller than the constant output value according to the comparison result (i.e., $P_1 - P_{ChgPwrLim} < P_{Load} < P_1$). Therefore, the controller 700 may determine the entire hatched area "Z1" on the graph as a constant output operable section.

Accordingly, the controller 700 may determine that the constant output considering the output efficiency of the fuel cell 100 is operable in the case that the current battery SOC and the load demanded output value are included in the constant output operable area Z1, and the controller 700 may determine that the constant output considering the output efficiency of the fuel cell 100 is not operable in the case that the current battery SOC and the load demanded output value are not included in the constant output operable area Z1.

Through this, it is possible to prevent the battery 200 from being overcharged by exceeding the maximum SOC of the battery according to the constant output of the fuel cell 100.

Meanwhile, in the case that it is determined that the constant output considering the output efficiency of the fuel cell 100 is not operable as a result of the determination, the controller 700 may determine again whether the constant output is operable in further consideration of the changed current battery SOC or the changed load demanded output value and a hysteresis value.

In this case, the hysteresis value may be a hysteresis value for the SOC only if the current battery SOC is changed in a state where there is no change in the load demanded output value, or the hysteresis value may be a hysteresis value for the load demanded output value only if the load demanded output value is changed in a state where there is no change in the current battery SOC.

Referring to the graph shown in FIG. 3, the straight line located on the right side may be defined by the following equation.

$$SOC = a(P_{Load} - P_1) + SOC_{High} - SOC_{Hyst}, \text{ or}$$

$$P_{Load} = \frac{SOC - SOC_{High}}{a} + P_1 + P_{Hyst}$$

Here, $SOC_{Hyst}$ corresponds to a hysteresis value for SOC, and $P_{Hyst}$ corresponds to a hysteresis value for the load demanded output value. In other words, the straight line located on the right corresponds to a straight line moved to the right by the hysteresis value for the load demanded output value in the direction of the horizontal axis from the straight line located on the left or a straight line moved downward by the hysteresis value for SOC in the direction of the vertical axis from the straight line located on the left.

Upon determination, the controller 700 may determine that the constant output considering the output efficiency of the fuel cell 100 is operable in a section satisfying the following equation on the graph.

$$SOC \le a(P_{Load} - P_1) + SOC_{High} - SOC_{Hyst}, \text{ or}$$

$$P_{Load} \ge \frac{SOC - SOC_{High}}{a} + P_1 + P_{Hyst}$$

In other words, the controller 700 may determine a small hatched area "Z1'" on the graph as a constant output operable section during the re-determination.

Accordingly, in the case that the changed current battery SOC and the changed load demanded output value are included in the constant output operable area Z1' during the re-determination, the controller 700 may determine that the constant output considering the output efficiency of the fuel cell 100 is operable. In the case that the current battery SOC and the load demanded output value are not included in the constant output operable area Z1' during the re-determination, the controller 700 may determine that the constant output considering the output efficiency of the fuel cell 100 is not operable.

In the case that overcharge is concerned through the above re-determination process, the constant output of the fuel cell 100 is not allowed, but constant output control is performed in the case that the constant output is operable by reflecting the current battery SOC or change in load demanded output. By doing so, it is possible to secure a section in which the fuel cell 100 travels with constant output.

Figure 4:
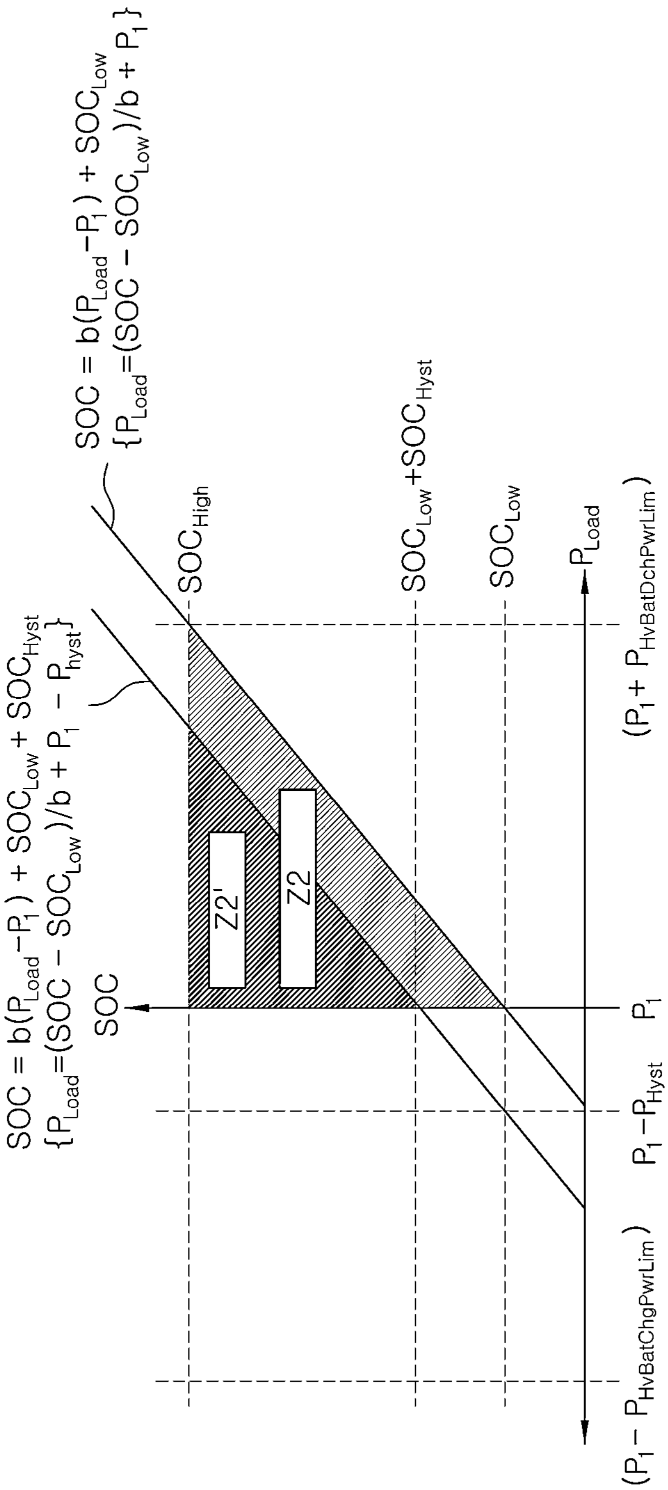
FIG. 4 is a diagram illustrating a battery discharge-constant output logic of a fuel cell vehicle according to an embodiment of the disclosure.

FIG. 4 is a diagram illustrating a battery discharge-constant output logic of a fuel cell vehicle according to an embodiment of the disclosure.

Referring to FIG. 4, a graph in which a horizontal axis is the load demanded output value ($P_{Load}$) and a vertical axis is the SOC is shown.

The straight line located on the right side may be defined by the following equation.

$$SOC = b(P_{Load} - P_1) + SOC_{Low}, \text{ or}$$

$$P_{Load} = \frac{SOC - SOC_{Low}}{b} + P_1$$

Here, SOC is the current battery SOC, b is a second constant corresponding to the slope of the straight line, $P_{Load}$ is the load demanded output value, $P_1$ is the constant output value, and $SOC_{Low}$ is the minimum SOC of the battery.

When the load demanded output value is greater than or equal to the constant output value, the controller 700 may determine that the constant output considering the output efficiency of the fuel cell 100 is operable if the current battery SOC is greater than or equal to a value obtained by adding a SOC corresponding to a value, which is obtained by multiplying the portion exceeding the current output value among the load demanded output value by a second constant, to the minimum SOC of the battery.

In other words, it may be determined that the constant output considering the output efficiency of the fuel cell 100 is operable in a section satisfying the following equation on the graph.

$$SOC \ge b(P_{Load} - P_1) + SOC_{Low}, \text{ or}$$

$$P_{Load} \le \frac{SOC - SOC_{Low}}{b} + P_1$$

Here, as the precondition is satisfied, it is assumed that the load demanded output value is smaller than a value obtained by adding the maximum dischargeable output value of the battery to the constant output value, and greater than the constant output value according to the comparison result (i.e., $P_1 \le P_{Load} < P_1 + P_{DchPwrLim}$). Therefore, the controller 700 may determine the entire hatched area Z2 on the graph as a constant output operable section.

Accordingly, the controller 700 may determine that the constant output considering the output efficiency of the fuel cell 100 is operable when the current battery SOC and the load demanded output value are included in the constant output operable area Z2, and the controller 700 may determine that the constant output considering the output efficiency of the fuel cell 100 is not operable when the current battery SOC and the load demanded output value are not included in the constant output operable area Z2.

With this configuration, it is possible to prevent the battery 200 from being over-discharged by exceeding the minimum SOC of the battery according to the constant output of the fuel cell 100.

As described above with reference to FIG. 3, when it is determined that the constant output considering the output efficiency of the fuel cell 100 is not operable as a result of the determination, the controller 700 may determine again whether the constant output is operable in further consideration of the changed current battery SOC or the changed load demanded output value and a hysteresis value.

Referring to the graph shown in FIG. 4, the straight line located on the left side may be defined by the following equation.

$$SOC = b(P_{Load} - P_1) + SOC_{Low} + SOC_{Hyst}, \text{ or}$$

$$P_{Load} = \frac{SOC - SOC_{Low}}{b} + P_1 - P_{Hyst}$$

In other words, the straight line located on the left corresponds to a straight line moved to the left by the hysteresis value for the load demanded output value in the direction of the horizontal axis from the straight line located on the right or a straight line moved upward by the hysteresis value for SOC in the direction of the vertical axis from the straight line located on the right.

The controller 700 may further determine that the constant output considering the output efficiency of the fuel cell 100 is operable in a section satisfying the following equation on the graph.

$$SOC \geq b(P_{Load} - P_1) + SOC_{Low} + SOC_{Hyst}, \text{ or}$$

$$P_{Load} \leq \frac{SOC - SOC_{Low}}{b} + P_1 - P_{Hyst}$$

In other words, the controller 700 may determine a small hatched area 22' on the graph as a constant output operable section during the re-determination.

Accordingly, when the changed current battery SOC and the changed load demanded output value are included in the constant output operable area Z2' during the re-determination, the controller 700 may determine that the constant output considering the output efficiency of the fuel cell 100 is operable. In the case that the current battery SOC and the load demanded output value are not included in the constant output operable area 22' during the re-determination, the controller 700 may determine that the constant output considering the output efficiency of the fuel cell 100 is not operable.

In the case that over-discharge is concerned through the above re-determination process, the constant output of the fuel cell 100 is not allowed, but constant output control is performed in the case that the constant output is operable by reflecting the current battery SOC or change in load demanded output. By doing so, it is possible to secure a section in which the fuel cell 100 travels with constant output.

Figure 5:
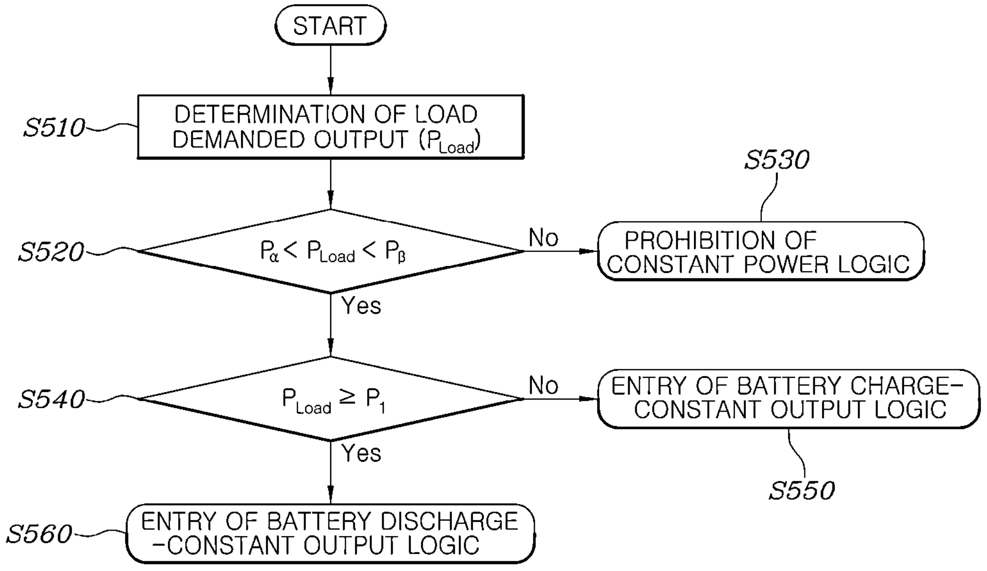
FIG. 5 is a flowchart illustrating a process of determining a precondition for constant output control according to an embodiment of the disclosure.
Figure 6:
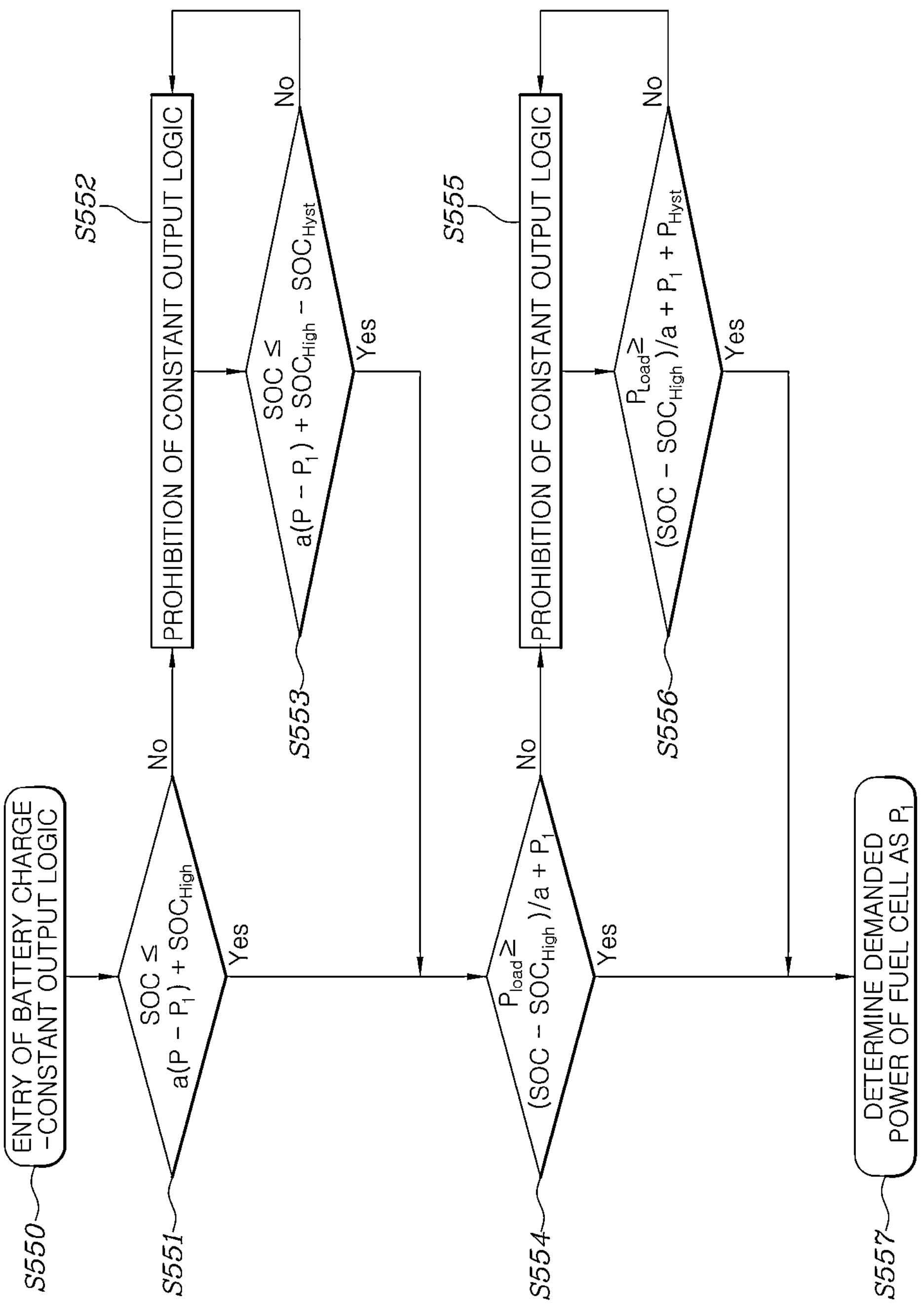
FIG. 6 is a flowchart illustrating a battery charge-constant output control process according to an embodiment of the disclosure.
Figure 7:
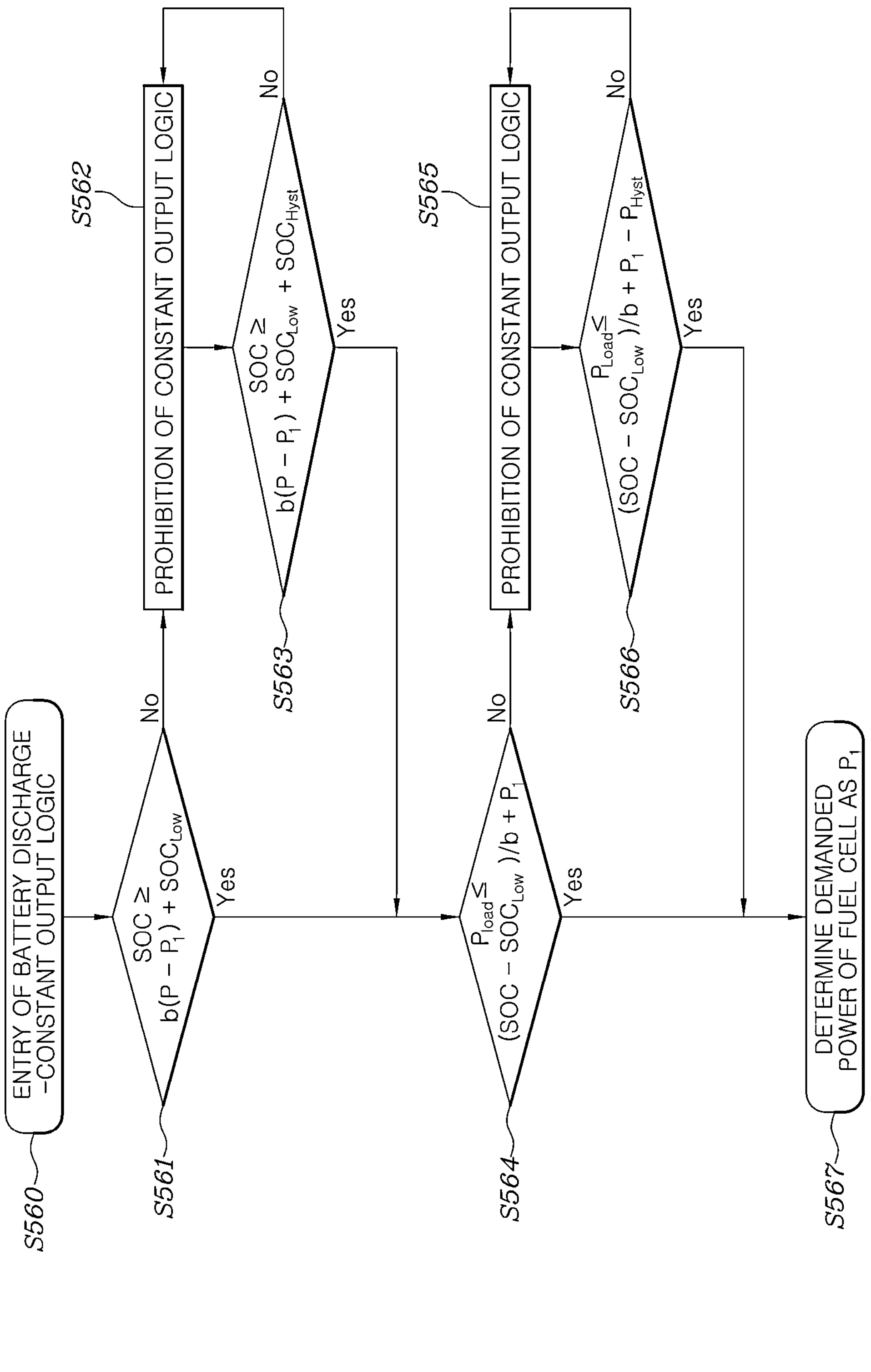
FIG. 7 is a flowchart illustrating a battery discharge-constant output control process according to an embodiment of the disclosure.

The process of controlling the constant output of the fuel cell described above is described as a flow chart as shown in FIGS. 5 to 7.

FIG. 5 is a flowchart illustrating a process of determining a precondition for constant output control according to an embodiment of the disclosure.

Referring to FIG. 5, the controller 700 may first determine a load demanded output value required for entire loads (S510).

Then, based on the determined load demanded output value, the controller 700 may determine whether the first condition related to the overcharge of the battery 200 and the second condition related to the over-discharge of the battery 200 are satisfied (S520).

When both the first condition and the second condition are satisfied ("Yes" in S520), the controller 700 may compare the load demanded output value and the constant output value (S540), and determine whether the constant output is operable in consideration of the output efficiency of the fuel cell 100 (S550, S560).

More specifically, if the load demanded output value is less than the constant output value ("No" in S540), the controller 700 enters the battery charge-constant output control logic to determine whether the constant output is operable. Also, if the load demanded output value is greater than or equal to the constant output value ("Yes" in S540), the controller 700 enters the battery discharge-constant output control logic to determine whether the constant output is operable.

A process of determining whether the constant output is operable is described below with reference to FIGS. 6 and 7.

FIG. 6 is a diagram for explaining a battery charge-constant output control process according to an embodiment of the disclosure.

Referring to FIG. 6, the controller 700 may determine whether the constant output is operable in consideration of the output efficiency of the fuel cell 100 based on the load demanded output value and the current battery SOC (State of Charge).

In this case, it is possible to determine whether the constant output of the fuel cell 100 is operable in further consideration of the constant output value and the maximum SOC of the battery determined based on the maximum dischargeable output value of the battery capable of discharging the battery to an upper discharge limit.

More specifically, the controller 700 may determine that the constant output considering the output efficiency of the fuel cell 100 is operable if the current battery SOC is less than or equal to a value obtained by subtracting a SOC corresponding to a value, which is obtained by multiplying the portion exceeding the load demanded output value among the constant output value by a first constant, from the maximum SOC of the battery ("Yes" in S551).

If the current battery SOC exceeds the value obtained by subtracting the SOC corresponding to a value, which is obtained by multiplying the portion exceeding the load demanded output value among the constant output value by the first constant, from the maximum SOC of the battery ("No" in S551), the constant output is prohibited (S552). In this case, it may be determined whether the constant output is operable in further consideration of the changed current battery SOC and the changed load demanded output value.

More specifically, when it is determined that the constant output of the fuel cell 100 is not operable, the controller 700 may re-determine whether the constant output is operable in further consideration of the changed current battery SOC or the changed load demanded output value and a hysteresis value (S553).

Meanwhile, the above processes (S551 to S553) are performed based on the current battery SOC, but may also be performed based on the load demanded output value (S554 to S556).

As a result of the determination or re-determination, in the case that the constant output considering the output efficiency of the fuel cell 100 is operable ("Yes" in S553), the controller 700 may determine the demanded output of the fuel cell as the constant output value (S557).

FIG. 7 is a diagram for explaining a battery discharge-constant output control process according to an embodiment of the disclosure.

Referring to FIG. 7, the controller 700 may determine whether the constant output is operable in consideration of the output efficiency of the fuel cell 100 based on the load demanded output value and the current battery SOC (State of Charge).

In this case, it is possible to determine whether the constant output of the fuel cell 100 is operable in further consideration of the constant output value and the minimum SOC of the battery determined based on the maximum chargeable output value of the battery capable of charging the battery to an upper charge limit.

More specifically, the controller 700 may determine that the constant output considering the output efficiency of the fuel cell 100 is operable if the current battery SOC is greater than or equal to a value obtained by adding a SOC corresponding to a value, which is obtained by multiplying the portion exceeding the current output value among the load demanded output value by a second constant, to the minimum SOC of the battery ("Yes" in S561).

If the current battery SOC is less than the value obtained by adding the SOC corresponding to a value, which is obtained by multiplying the portion exceeding the current output value among the load demanded output value by the second constant, to the minimum SOC of the battery ("No" in S561), the constant output is prohibited (S562). In this case, it may be re-determined whether the constant output is operable in further consideration of the changed current battery SOC and the changed load demanded output value.

More specifically, in the case that it is determined that the constant output of the fuel cell 100 is not operable, the controller 700 may re-determine whether the constant output is operable in further consideration of the changed current battery SOC or the changed load demanded output value and a hysteresis value (S563).

Meanwhile, the above processes (S561 to S563) are performed based on the current battery SOC, but may also be performed based on the load demanded output value (S564 to S566).

As a result of the determination or re-determination, in the case that the constant output considering the output efficiency of the fuel cell 100 is operable ("Yes" in S563), the controller 700 may determine the demanded output of the fuel cell as the constant output value (S567).

As described above, according to various embodiments of the disclosure, the constant output section of the fuel cell can be enlarged, and thus, the output efficiency can be improved.

In addition, as the constant output operation period of the fuel cell is enlarged, it is possible to minimize the output fluctuation of the fuel cell.

In addition, as the constant output operation section of the fuel cell is enlarged, the output consumption of fuel cell accessories can be reduced.

Furthermore, it is possible to improve the fuel efficiency of the fuel cell vehicle by improving the output efficiency of the fuel cell and reducing the output consumption of fuel cell accessories.

Although specific embodiments of the disclosure have been illustrated and described above, it should be apparent to those having ordinary skill in the art that the disclosure can be variously improved and changed without departing from the technical spirit of the disclosure provided.

What is claimed is:

1. A fuel cell vehicle, comprising:

a fuel cell; a battery; and a controller configured to:

determine a load demanded output value required by a load in the fuel cell vehicle;

determine whether a first condition related to overcharge of the battery and a second condition related to over-discharge of the battery are satisfied based on the load demanded output value, determine whether constant output of the fuel cell is operable based on the load demanded output value and a current battery SOC (state of charge) when the first and second conditions are satisfied, and control an output of the fuel cell based on whether the constant output is operable, wherein the controller is configured to determine whether the constant output is operable based on further a comparison result between a constant output value and the load demanded output value, wherein the controller is configured to define a constant output operable region based on a difference between the load demanded output value and the constant output value, and one or more of a predetermined minimum SOC of the battery and a predetermined maximum SOC of the battery, and determine whether the constant output of the fuel cell is operable based on whether the load demanded output value and the current battery SOC are included within the constant output operable region, wherein, when the load demanded output value is less than the constant output value, the controller is configured to determine that the constant output is operable, based on the current battery SOC being less than or equal to a value obtained by subtracting an SOC corresponding to a value obtained by multiplying an amount exceeding the load demanded output value among the constant output value by a first constant from a predetermined maximum SOC of the battery, and wherein, when the load demanded output value is greater than or equal to the constant output value, the controller is configured to determine that the constant output is operable, based on the current battery SOC being greater than or equal to a value obtained by adding an SOC corresponding to a value obtained by multiplying an amount exceeding the constant output value among the load demanded output value by a second constant to a predetermined minimum SOC of the battery.

2. The fuel cell vehicle of claim 1, wherein the controller is configured to determine the load demanded output value based on a sum of an output value distributed to the fuel cell, an accessory consumption output value of the fuel cell, an accessory consumption output value of the fuel cell vehicle, and a charge demanded output value of the battery.

3. The fuel cell vehicle of claim 1, wherein whether the first condition is satisfied is determined based on the constant output value, the load demanded output value, and a maximum chargeable output value of the battery capable of charging the battery to an upper charge limit.

4. The fuel cell vehicle of claim 3, wherein the first condition is satisfied when a value obtained by subtracting the load demanded output value from the constant output value is less than the maximum chargeable output value of the battery.

5. The fuel cell vehicle of claim 1, wherein whether the second condition is satisfied is determined based on the constant output value, the load demanded output value, an output value distributed to the battery among drive demanded output values of a driver, and a maximum dischargeable output value of the battery capable of discharging the battery to an upper discharge limit.

6. The fuel cell vehicle of claim 5, wherein the second condition is satisfied when a value obtained by subtracting the constant output value from the load demanded output value is less than a value obtained by subtracting the output value distributed to the battery from the maximum dischargeable output value of the battery.

7. The fuel cell vehicle of claim 1, wherein the controller is configured to determine whether the first and second conditions are satisfied based on whether the load demanded output value is included in a range of the load demanded output value preset to satisfy the first and second conditions.

8. The fuel cell vehicle of claim 1, wherein the maximum SOC of the battery is determined based on a maximum dischargeable output value of the battery capable of discharging the battery to an upper discharge limit value.

9. The fuel cell vehicle of claim 1, wherein the minimum SOC of the battery is determined based on a maximum chargeable output value of the battery capable of charging the battery to an upper charge limit.

10. The fuel cell vehicle of claim 1, wherein the controller is configured to determine whether the constant output is operable based on further a change in the current battery SOC or the load demanded output value.

11. The fuel cell vehicle of claim 10, wherein when the constant output is not operable, the controller is configured to re-determine whether the constant output is operable based on further the changed current battery SOC or the changed load demanded output value and a hysteresis value.

12. The fuel cell vehicle of claim 11, wherein the hysteresis value is a hysteresis value for SOC only when the current battery SOC is changed in a state where there is no change in the load demanded output value.

13. The fuel cell vehicle of claim 11, wherein the hysteresis value is a hysteresis value for the load demanded output value only when the load demanded output value is changed in a state where there is no change in the current battery SOC.

14. The fuel cell vehicle of claim 1, wherein the controller is configured to control an output of the fuel cell based on the constant output value when the constant output is operable.

15. The fuel cell vehicle of claim 1, wherein the controller is configured to control an output of the fuel cell based on the load demanded output value when the constant output is not operable.

16. The fuel cell vehicle of claim 1, wherein the controller is configured to control an output of the fuel cell based on further at least one of an output limit value according to a performance of the fuel cell and an output limit value according to a performance of a converter provided in the fuel cell vehicle.

17. A method for controlling a fuel cell vehicle, the method comprising:

determining a load demanded output value required for an entire load of the fuel cell vehicle;

determining whether a first condition related to overcharge of a battery and a second condition related to over-discharge of the battery are satisfied based on the load demanded output value;

determining whether constant output of a fuel cell is operable based on the load demanded output value and a current battery SOC (State of Charge) when the first condition and the second condition are satisfied; and controlling an output of the fuel cell in response to whether the constant output is operable, wherein determining whether the constant output of the fuel cell is operable includes defining a constant output operable region based on a difference between the load demanded output value and a constant output value, and one or more of a predetermined minimum SOC of the battery and a predetermined maximum SOC of the battery, and determining whether the constant output of the fuel cell is operable based on whether the load demanded output value and the current battery SOC are included within the constant output operable region, wherein, when the load demanded output value is less than the constant output value, determining that the constant output is operable, based on the current battery SOC being less than or equal to a value obtained by subtracting an SOC corresponding to a value obtained by multiplying an amount exceeding the load demanded output value among the constant output value by a first constant from a predetermined maximum SOC of the battery, and wherein, when the load demanded output value is greater than or equal to the constant output value, determining that the constant output is operable, based on the current battery SOC being greater than or equal to a value obtained by adding an SOC corresponding to a value obtained by multiplying an amount exceeding the constant output value among the load demanded output value by a second constant to a predetermined minimum SOC of the battery.

* * * * *